(12) United States Patent
Kaplinger et al.

(10) Patent No.: US 10,311,425 B2
(45) Date of Patent: *Jun. 4, 2019

(54) INTEGRATING MOBILE PAYMENT APPLICATION WITH OTHER MOBILE APPLICATIONS WHILE PREVENTING SECURITY EXPOSURES

(71) Applicant: International Business Machines Corporation, Armonk, NY (US)

(72) Inventors: Todd E. Kaplinger, Raleigh, NC (US); Gal Shachor, Yokneam (IL); Gregory L. Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1340 days.

This patent is subject to a terminal disclaimer.

(21) Appl. No.: 14/154,376

(22) Filed: Jan. 14, 2014

(65) Prior Publication Data

US 2015/0199678 A1    Jul. 16, 2015

(51) Int. Cl.
*G06K 5/00* (2006.01)
*G06Q 20/32* (2012.01)
(Continued)

(52) U.S. Cl.
CPC ....... *G06Q 20/3227* (2013.01); *G06Q 20/322* (2013.01); *G06Q 20/3221* (2013.01);
(Continued)

(58) Field of Classification Search
CPC ............. G06Q 30/0601; G06Q 20/204; G06Q 20/3223; G06Q 20/3278; G06Q 20/102;
(Continued)

(56) References Cited

U.S. PATENT DOCUMENTS 7,823,192 B1    10/2010    Fultz et al.
2002/0004783 A1*    1/2002    Paltenghe .............. G06Q 20/00
                                                    705/41

(Continued)

FOREIGN PATENT DOCUMENTS

WO    2012065128 A1    5/2012
WO    2013056104 A1    4/2013

OTHER PUBLICATIONS

Office Action for U.S. Appl. No. 14/247,424 dated Mar. 24, 2016, pp. 1-29.

(Continued)

*Primary Examiner* — Thien T Mai
(74) *Attorney, Agent, or Firm* — Robert A. Voigt, Jr.; Winstead, P.C.

(57) ABSTRACT

A method, system and computer program product for integrating a mobile payment application with other mobile applications while preventing security exposures. A set of application programming interfaces of mobile applications that may possibly be utilized by a pass created by a mobile payment application is generated in response to receiving an indication that the pass was created. A "pass," as used herein, refers to a form of mobile payment, such as a gift card. A selection of these application programming interfaces may then be received to interact with the created pass. In this manner, the existing mobile applications are seamlessly integrated with the features of passes. Furthermore, a virtual container is created for the created pass and the selected application programming interfaces to interface with the created pass. By creating such a container, the data to be exposed to the application layer can be controlled.

16 Claims, 3 Drawing Sheets

(51) Int. Cl.
 *G06Q 20/36* (2012.01)
 *G06Q 20/34* (2012.01)

(52) U.S. Cl.
 CPC ....... *G06Q 20/3274* (2013.01); *G06Q 20/342* (2013.01); *G06Q 20/363* (2013.01); *G06Q 20/3672* (2013.01); *G06Q 2220/00* (2013.01)

(58) Field of Classification Search
 CPC .. G06Q 20/027; G06Q 20/085; G06Q 20/322; G06Q 20/3227; G06Q 20/356; G06Q 20/06; G06Q 20/1235
 See application file for complete search history.

(56) References Cited

U.S. PATENT DOCUMENTS

| | | | |
|---|---|---|---|
| 2006/0041603 | A1 | 2/2006 | Paterson et al. |
| 2007/0192465 | A1 | 8/2007 | Modarressi |
| 2012/0150669 | A1* | 6/2012 | Langley ............. G06Q 30/0601 705/16 |
| 2012/0259686 | A1 | 10/2012 | Yurow |
| 2012/0290449 | A1* | 11/2012 | Mullen .................. G06Q 10/00 705/27.2 |
| 2012/0290938 | A1 | 11/2012 | Subbarao et al. |
| 2012/0324556 | A1 | 12/2012 | Yefimov et al. |
| 2013/0067496 | A1 | 3/2013 | Thollot et al. |
| 2013/0124606 | A1 | 5/2013 | Carpenter et al. |
| 2013/0325569 | A1 | 12/2013 | Holmes et al. |
| 2014/0058938 | A1 | 2/2014 | McClung, III |
| 2014/0095692 | A1 | 4/2014 | Anderson et al. |
| 2014/0282608 | A1 | 9/2014 | Biancalana et al. |
| 2015/0161649 | A1 | 6/2015 | Eggleston et al. |
| 2015/0235212 | A1* | 8/2015 | Ortiz .................... G06Q 20/322 705/44 |
| 2015/0286747 | A1 | 10/2015 | Anastasakos et al. |
| 2015/0302374 | A1* | 10/2015 | Sartor .................... G06Q 20/02 705/16 |

OTHER PUBLICATIONS

Office Action for U.S. Appl. No. 14/607,633 dated Mar. 24, 2016, pp. 1-24.
Office Action for U.S. Appl. No. 14/247,424 dated Aug. 1, 2016, pp. 1-30.
Office Action for U.S. Appl. No. 14/607,633 dated Aug. 2, 2016, pp. 1-28.
"Method of Linking Web-Based Applications and Local Apps for Communication," Anonymous, IPCOM000215859D, Mar. 13, 2012, pp. 1-3.
"Passbook," http://en.wikipedia.org/wiki/Passbook, 2013, pp. 1-2.
"PassWallet," https://play.google.com/store/apps/details?id=com.attidomobile.passwallet&hl=en, 2013, pp. 1-4.
"Mobile Device Management: Automated Device Lifecycle Management," http://www1.good.com/platform/mobile-application-security, 2013, pp. 1-3.
UIWebView Class Reference, "http://developer.apple.com/library/ios/#documentation/uikit/reference/UIWebView_Class/Reference/Reference.html," 2013, pp. 1-16.
James Trew, "Apple Unveils iOS 6 at WWDC, Launch Apps with Siri, Facebook Integration, Maps," Jun. 11, 2012, pp. 1-10.
Office Action for U.S. Appl. No. 14/486,880 dated Sep. 28, 2016, pp. 1-26.
Office Action for U.S. Appl. No. 14/486,880 dated Mar. 7, 2017, pp. 1-18.
Office Action for U.S. Appl. No. 14/607,633 dated Mar. 8, 2017, pp. 1-12.
Office Action for U.S. Appl. No. 14/247,424 dated Mar. 8, 2017, pp. 1-12.

* cited by examiner

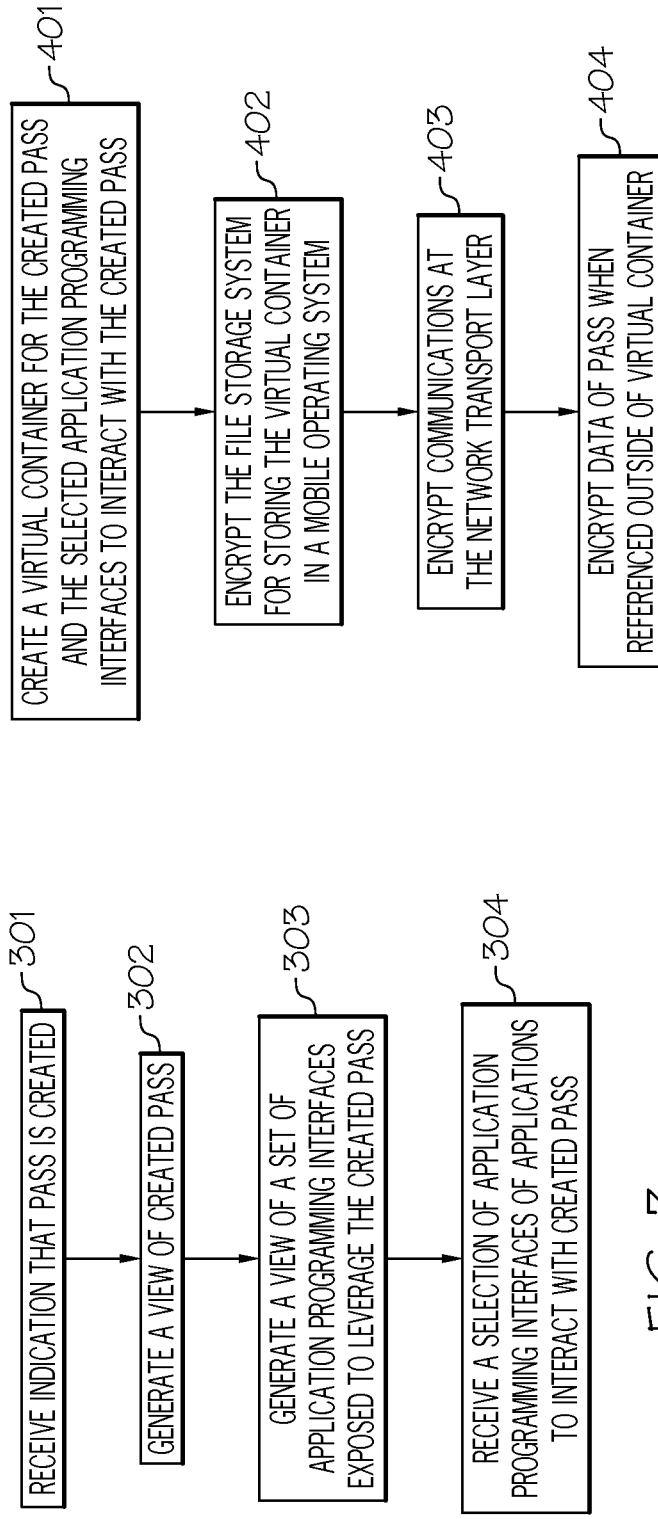

INTEGRATING MOBILE PAYMENT APPLICATION WITH OTHER MOBILE APPLICATIONS WHILE PREVENTING SECURITY EXPOSURES

TECHNICAL FIELD

The present invention relates generally to mobile payment applications, and more particularly to integrating a mobile payment application with other mobile applications while preventing security exposures.

BACKGROUND

Mobile payment applications, such as Apple's Passbook®, allow users to store gift cards, generic cards and other forms of mobile payment. Each card or form of mobile payment may be known as a "pass" or a "payment token." Each pass may consist of a collection of JavaScript Object Notation (JSON) files and images.

Currently, passes are treated as a separate entity that are hosted by the mobile payment application, separate from other applications, including the business application that may have generated the card (e.g., gift card) used to create the pass. For example, Starbucks® has a mobile application that allows the user to create gift cards, select favorite store locations as well as monitor and track rewards. When a gift card is created, a pass (e.g., Starbucks® pass) corresponding to the gift needs to be created in order for the mobile payment application to use the gift card. In another example, when the user selects a favorite store location in Starbucks® application, the mobile payment application does not inherit these preferences until the mobile payment application is accessed thereby allowing such preferences to be inherited by the Starbucks® pass. As a result, there is a period of time in which the mobile payment application does not have access to the user's preferences or mobile payments which may result in an undesired user experience.

Hence, there is currently not a means for seamlessly integrating the features of passes with existing mobile applications.

Furthermore, the passes that are currently stored by the mobile payment application may not be entirely secure. For example, the stored passes may not be encrypted or stored in a secure location within the mobile device. Neither does the mobile payment application extend such security when the data is referenced outside of the mobile payment application. For example, transactions directly involving the pass may not be entirely secure. For instance, the gift card number of the pass may be represented by a bar code or Quick Response code that is not securely encrypted thereby allowing others to obtain the gift card number.

As a result, the features of passes are not seamlessly integrated with other existing mobile applications while preventing security exposures.

BRIEF SUMMARY

In one embodiment of the present invention, a method for integrating a mobile payment application with other mobile applications comprises receiving an indication that a pass was created by the mobile payment application, where the pass corresponds to a form of mobile payment. The method further comprises generating a view of the created pass. The method additionally comprises generating, by a processor, a view of a set of application programming interfaces exposed to leverage the created pass. In addition, the method comprises receiving a selection of one or more of the set of application programming interfaces to interact with the created pass.

Other forms of the embodiment of the method described above are in a system and in a computer program product.

In another embodiment of the present invention, a method for integrating a mobile payment application with other mobile applications while preventing security exposures comprises receiving an indication that a pass was created by the mobile payment application, where the pass corresponds to a form of mobile payment. The method further comprises generating a view of a set of application programming interfaces exposed to leverage the created pass. The method additionally comprises receiving a selection of one or more of the set of application programming interfaces to interact with the created pass. In addition, the method comprises creating, by a processor, a virtual container for the created pass and the one or more of the set of application programming interfaces selected to interact with the created pass.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 3 is a flowchart of a method for integrating the mobile payment application with other mobile applications in accordance with an embodiment of the present invention; and FIG. 4 is a flowchart of a method for preventing security exposures when integrating the mobile payment application with other mobile applications in accordance with an embodiment of the present invention.

DETAILED DESCRIPTION

The present invention comprises a method, system and computer program product for integrating a mobile payment application with other mobile applications while preventing security exposures. In one embodiment of the present invention, a set of application programming interfaces of the mobile applications that may possibly be utilized by a pass created by a mobile payment application is generated in response to receiving an indication that the pass was created. A "pass," as used herein, refers to a form of mobile payment, such as a gift card, a credit card, etc. A selection of these application programming interfaces may then be received to interact with the created pass. In this manner, the existing mobile applications are seamlessly integrated with the features of the passes. Furthermore, a virtual container is created for the created pass and the selected application programming interfaces to interface with the created pass. By creating such a container for each pass and the application programming interfaces for the applications to interact with the pass, the data to be exposed to the application layer can be controlled and exposure limited in the file storage system and the network transport layer.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
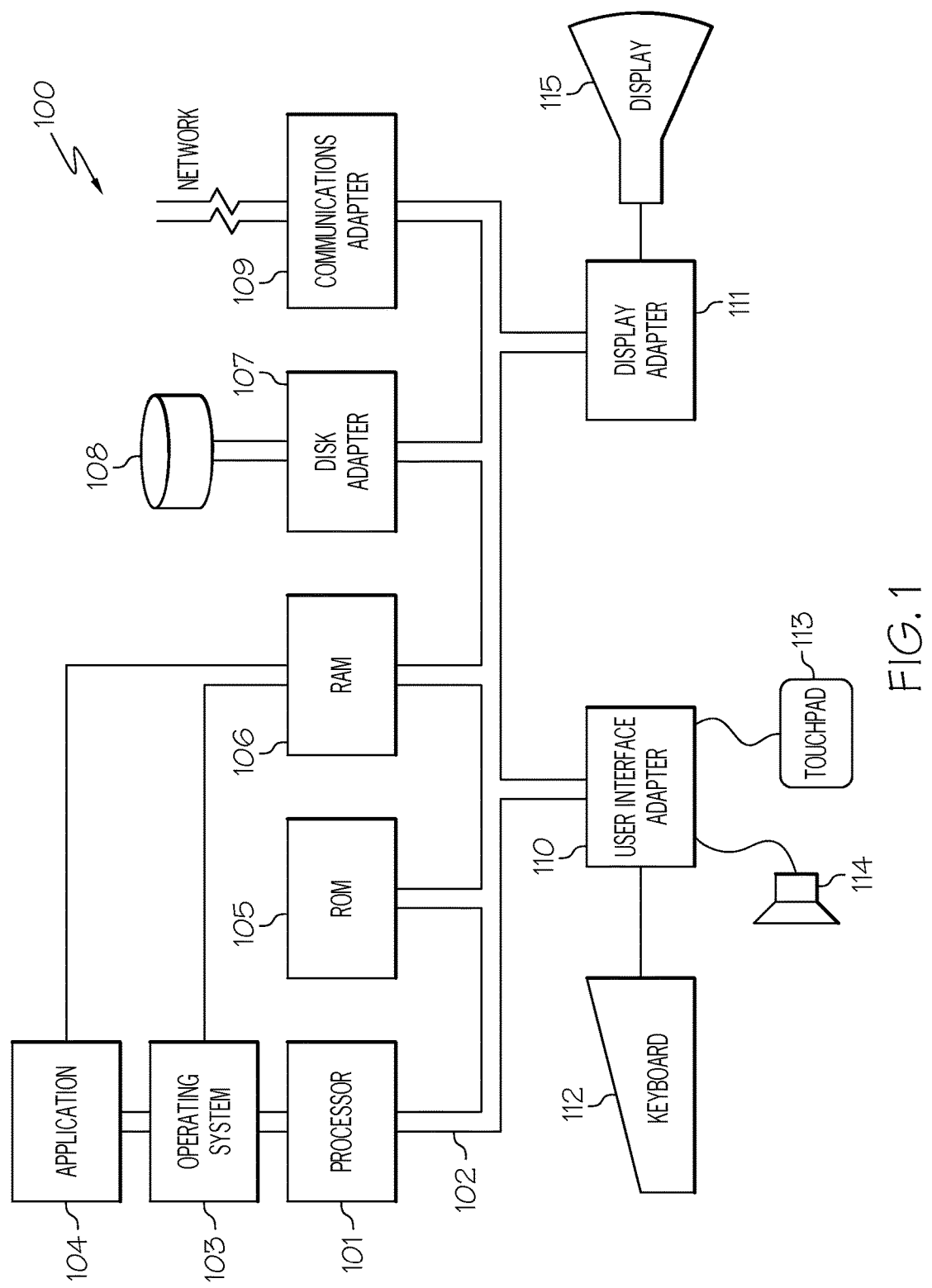
FIG. 1 illustrates a hardware configuration of a mobile device for practicing the principles of the present invention in accordance with an embodiment of the present invention.

Referring now to the Figures in detail, FIG. 1 illustrates a hardware configuration of a mobile device 100 for practicing the principles of the present invention in accordance with an embodiment of the present invention. Mobile device 100 may be any mobile computing device, including, but not limited to, a mobile phone, a cellular phone, a smartphone, a personal digital assistance (PDA), a gaming unit, a portable computing unit, a tablet personal computer and the like.

As illustrated in FIG. 1, mobile device 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for integrating a mobile payment application with other mobile applications while preventing security exposures as discussed further below in association with FIGS. 2-4.

Referring again to FIG. 1, read-only memory ("ROM") 105 is coupled to system bus 102 and includes a basic input/output system ("BIOS") that controls certain basic functions of mobile device 100. Random access memory ("RAM") 106 and disk adapter 107 are also coupled to system bus 102. It should be noted that software components including operating system 103 and application 104 may be loaded into RAM 106, which may be mobile device's 100 main memory for execution. Disk adapter 107 may be an integrated drive electronics ("IDE") adapter that communicates with a disk unit 108, e.g., disk drive. It is noted that the program for integrating a mobile payment application with other mobile applications while preventing security exposures, as discussed further below in association with FIGS. 2-4, may reside in disk unit 108 or in application 104.

Mobile device 100 may further include a communications adapter 109 coupled to bus 102. Communications adapter 109 interconnects bus 102 with an outside network thereby enabling mobile device 100 to communicate with other devices (e.g., computer networking devices, mobile devices).

I/O devices may also be connected to mobile device 100 via a user interface adapter 110 and a display adapter 111. Keyboard 112, touchpad 113 and speaker 114 may all be interconnected to bus 102 through user interface adapter 110. Data may be inputted to mobile device 100 through any of these devices. A display monitor 115 may be connected to system bus 102 by display adapter 111. In this manner, a user is capable of inputting to mobile device 100 through keyboard 112 or touchpad 113 and receiving output from mobile device 100 via display 115 or speaker 114. Other input mechanisms may be used to input data to mobile device 100 that are not shown in FIG. 1, such as display 115 having touch-screen capability and keyboard 112 being a virtual keyboard. Mobile device 100 of FIG. 1 is not to be limited in scope to the elements depicted in FIG. 1 and may include fewer or additional elements than depicted in FIG. 1.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As stated in the Background section, currently, passes (forms of mobile payments) are treated as a separate entity that are hosted by the mobile payment application, separate from other applications, including the business application that may have generated the card (e.g., gift card) used to create the pass. For example, Starbucks® has a mobile application that allows the user to create gift cards, select favorite store locations as well as monitor and track rewards. When a gift card is created, a pass (e.g., Starbucks® pass) corresponding to the gift needs to be created in order for the mobile payment application to use the gift card. In another example, when the user selects a favorite store location in Starbucks® application, the mobile payment application does inherit these preferences until the mobile payment application is accessed thereby allowing such preferences to be inherited by the Starbucks® pass. As a result, there is a period of time in which the mobile payment application does not have access to the user's preferences or mobile payments which may result in an undesired user experience. Hence, there is currently not a means for seamlessly integrating the features of passes with existing mobile applications. Furthermore, the passes that are currently stored by the mobile payment application may not be entirely secure. For example, the stored passes may not be encrypted or stored in a secure location within the mobile device. Neither does the mobile payment application extend such security when the data is referenced outside of the mobile payment application. For example, transactions directly involving the pass may not be entirely secure. For instance, the gift card number of the pass may be represented by a bar code or Quick Response code that is not securely encrypted thereby allowing others to obtain the gift card number. As a result, the features of passes are not seamlessly integrated with other existing mobile applications while preventing security exposures.

Figure 2:
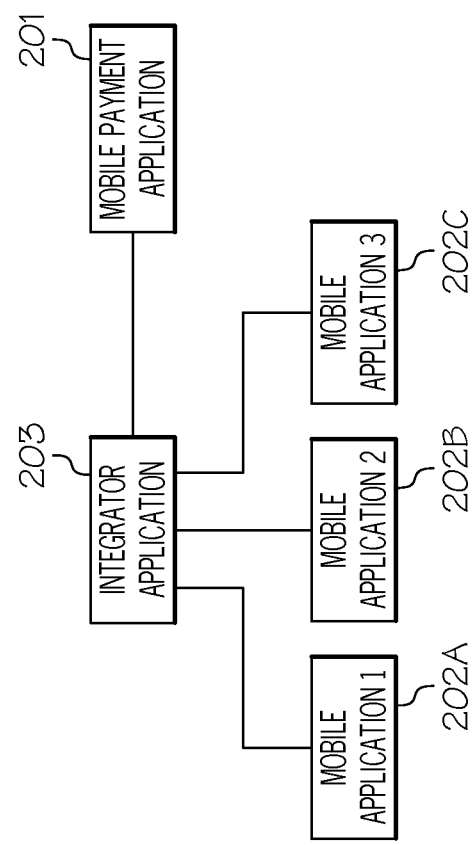
FIG. 2 is a diagram of the software components used in connection with integrating the mobile payment application with other mobile applications while preventing security exposures in accordance with an embodiment of the present invention.

The principles of the present invention provide a means for integrating the mobile payment application with other mobile applications while preventing security exposures as discussed below in association with FIGS. 2-4. FIG. 2 is a diagram of the software components used in connection with integrating the mobile payment application with other mobile applications while preventing security exposures. FIG. 3 is a flowchart of a method for integrating the mobile payment application with other mobile applications. FIG. 4 is a flowchart of a method for preventing security exposures when integrating the mobile payment application with other mobile applications.

As stated above, FIG. 2 is a diagram of the software components used in connection with integrating the mobile payment application with other mobile applications while preventing security exposures in accordance with an embodiment of the present invention. In one embodiment, these software components may reside in application 104 (FIG. 1).

The following provides a brief description of these software components. A more detailed description of these software components is provided below in conjunction with FIGS. 3-4, where their functionalities are discussed below in connection with the methods of FIGS. 3 and 4.

Referring to FIG. 2, the software components include a mobile payment application 201, such as Apple's Passbook®, which is used by the user of mobile device 100 (FIG. 1) to create a pass. A "pass," as used herein, refers to a form of mobile payment, such as a gift card, a credit card, etc. The pass may consist of a collection of JavaScript Object Notation (JSON) files and images.

The software components further include other mobile applications 202A-202C (e.g., enterprise applications, such as the Starbucks® application that allows the user to create gift cards, select favorite store locations as well as monitor and track rewards) that may be used by the user of mobile device 100. Mobile applications 202A-202C may collectively or individually be referred to as mobile applications 202 or mobile application 202, respectively. Mobile application 202 may include any application on mobile device 100 that has the possibility of interacting with mobile payment application 201, such as enterprise applications or device applications (e.g., camera application, e-mail application). While FIG. 2 illustrates three mobile applications 202, mobile device 100 may include any number of mobile applications 202.

Furthermore, FIG. 2 illustrates an application, referred to herein as the "integrator application" 203, configured to integrate mobile payment application 201 with the other mobile applications 202 while preventing security exposures as discussed further below in connection with FIGS. 3-4.

As stated above, FIG. 3 is a flowchart of a method 300 for integrating the mobile payment application with other mobile applications in accordance with an embodiment of the present invention.

Referring to FIG. 2, in conjunction with FIG. 1, in step 301, integrator application 203 receives an indication that a pass is created by mobile payment application 201. As discussed above, a "pass" refers to a form of mobile payment, such as a gift card, a credit card, etc. In one embodiment, a pass is created by the user of mobile device 100 using mobile payment application 201, where the pass may consist of a collection of JavaScript Object Notation (JSON) files and images. Upon creating the pass, mobile payment application 201 may inform integrator application 203.

In step 302, integrator application 203 generates a view of the created pass. For example, in one embodiment, integrator application 203 may utilize Cardova's WebView to view the created pass. By allowing the user to view the created pass using Cardova's WebView, the user will be able to more easily identify the pass and select the application programming interfaces to interact with the created pass (discussed further below) as opposed to presenting the pass as a static HTML document.

In step 303, integrator application 203 generates a view of a set of application programming interfaces exposed to leverage the created pass. For example, integrator application 203 may generate a listing of application programming interfaces of mobile applications 202 that may possibly be utilized by the created pass. The listing of application programming interfaces of mobile applications 202 may include application programming interfaces for enterprise applications. The listing of application programming interfaces of mobile applications 202 may also include device application programming interfaces.

In step 304, integrator application 203 receives a selection of application programming interfaces out of the displayed set of application programming interfaces of applications 202 to interact with the created pass. In this manner, existing mobile applications 202 are seamlessly integrated with the features of passes. For example, assuming that one of the mobile applications 202 corresponds to the Starbucks® application that allows the user to create gift cards, select favorite store locations as well as monitor and track rewards, when the user now selects a favorite store location in the Starbucks® application, such information will automatically be accessible by the pass as opposed to requiring the user to context switch (process of storing and restoring the state (context) of a process so that execution can be resumed from the same point at a later time) between the applications.

In addition to integrating the features of passes with the existing mobile applications 202, security exposures, such as exposing data referenced outside of the mobile payment application, need to be prevented. A method for preventing such security exposures is discussed below in connection with FIG. 4.

FIG. 4 is a flowchart of a method 400 for preventing security exposures when integrating the mobile payment application with other mobile applications in accordance with an embodiment of the present invention.

Referring to FIG. 4, in conjunction with FIGS. 1-3, in step 401, integrator application 203 creates a virtual container (also referred to as a "sandbox") for the created pass (see step 301 of FIG. 3) and the selected application programming interfaces to interact with the created pass (see step 304 of FIG. 3). By creating such a container for each pass and the application programming interfaces for the applications to interact with the pass, the data to be exposed to the application layer can be controlled. In order to provide a secure container, exposure may be limited to the file storage system and the network transport layer as discussed below. In one embodiment, the virtual container may be created utilizing Cardova's WebView thereby allowing the user of mobile device 100 to provide the required security restrictions to prevent security exposures from being realized, especially when using barcodes (e.g., barcode of the gift code stored as a pass) and near field communications (e.g., sending the data of the pass utilizing radio communication) in support of the mobile payments.

In step 402, integrator application 203 encrypts the file storage system for storing the virtual container in a mobile operating system (e.g., operating system 103 of mobile device 100). In this manner, the passes that are stored in the file storage system will have added security.

In step 403, integrator application 203 encrypts communications at the network transport layer.

In step 404, integrator application 203 encrypts the data of the pass when referenced outside of the virtual container. In this manner, the data from the passes will have added security when referenced outside of the virtual container.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a computer readable storage medium for integrating a mobile payment application with other mobile applications while preventing security exposures, the computer program product comprising the programming instructions for:

receiving an indication that a pass was created by said mobile payment application, wherein said pass corresponds to a form of mobile payment;

generating a view of a set of application programming interfaces exposed to leverage said created pass;

receiving a selection of one or more of said set of application programming interfaces to interact with said created pass thereby allowing one or more existing mobile applications to seamlessly be integrated with features of said created pass; and creating a virtual container for said created pass and said one or more of said set of application programming interfaces selected to interact with said created pass in order to control data to be exposed to an application layer.

2. The computer program product as recited in claim 1 further comprising the programming instructions for:
encrypting a file storage system for storing said virtual container in a mobile operating system.

3. The computer program product as recited in claim 1 further comprising the programming instructions for:
encrypting communications at a network transport layer.

4. The computer program product as recited in claim 1 further comprising the programming instructions for:
encrypting data of said pass when referenced outside of said virtual container.

5. The computer program product as recited in claim 4, wherein said form of mobile payment comprises a gift card.

6. The computer program product as recited in claim 5, wherein a barcode of said gift card is encrypted when referenced outside of said virtual container.

7. The computer program product as recited in claim 1, wherein said set of application programming interfaces comprises application programming interfaces for enterprise applications.

8. The computer program product as recited in claim 1, wherein said set of application programming interfaces comprises device application programming interfaces.

9. A system, comprising:
a memory unit for storing a computer program for integrating a mobile payment application with other mobile applications while preventing security exposures; and
a processor coupled to said memory unit, wherein said processor, responsive to said computer program, comprises:
circuitry for receiving an indication that a pass was created by said mobile payment application, wherein said pass corresponds to a form of mobile payment;
circuitry for generating a view of a set of application programming interfaces exposed to leverage said created pass;
circuitry for receiving a selection of one or more of said set of application programming interfaces to interact with said created pass thereby allowing one or more existing mobile applications to seamlessly be integrated with features of said created pass; and
circuitry for creating a virtual container for said created pass and said one or more of said set of application programming interfaces selected to interact with said created pass in order to control data to be exposed to an application layer.

10. The system as recited in claim 9, wherein said processor further comprises:
circuitry for encrypting a file storage system for storing said virtual container in a mobile operating system.

11. The system as recited in claim 9, wherein said processor further comprises:
circuitry for encrypting communications at a network transport layer.

12. The system as recited in claim 9, wherein said processor further comprises:
circuitry for encrypting data of said pass when referenced outside of said virtual container.

13. The system as recited in claim 12, wherein said form of mobile payment comprises a gift card.

14. The system as recited in claim 13, wherein a barcode of said gift card is encrypted when referenced outside of said virtual container.

15. The system as recited in claim 9, wherein said set of application programming interfaces comprises application programming interfaces for enterprise applications.

16. The system as recited in claim 9, wherein said set of application programming interfaces comprises device application programming interfaces.

* * * * *